(12) United States Patent
Kumon (10) Patent No.: US 6,513,292 B2
(45) Date of Patent: Feb. 4, 2003

(54) BUILDING PANEL

(75) Inventor: Shigetomi Kumon, Saijo (JP)

(73) Assignee: Kumon Building Constructor's Office, Inc., Saijo (JP)

( * ) Notice: Subject to any disclaimer, the term of this patent is extended or adjusted under 35 U.S.C. 154(b) by 0 days.

(21) Appl. No.: 09/543,896

(22) Filed: Apr. 6, 2000

(65) Prior Publication Data

US 2002/0100240 A1 Aug. 1, 2002

(30) Foreign Application Priority Data

Sep. 30, 1999 (JP) .......................... 11-277877

(51) Int. Cl.[7] .............................. E04C 2/32; E04C 1/40; B32B 3/30
(52) U.S. Cl. .................... 52/309.9; 52/309.14; 52/630; 52/794.1; 428/167
(58) Field of Search ...................... 52/764, 780, 781.3, 52/630, 270, 284, 762, 475.1, 476, 477; 428/213, 156, 158, 160, 167, 77, 78, 573, 574, 575, 600, 602

(56) References Cited

U.S. PATENT DOCUMENTS

| | | | | |
|---|---|---|---|---|
| 1,485,449 A | * | 3/1924 | Baloun | ........................ 52/764 |
| 3,870,665 A | * | 3/1975 | Diehr et al. | ................... 524/13 |
| 3,888,060 A | * | 6/1975 | Haener | ......................... 52/284 |
| 5,017,319 A | * | 5/1991 | Shen | ............................ 264/124 |
| 5,761,865 A | * | 6/1998 | Schiedegger et al. | ....... 52/475.1 |
| 5,946,878 A | * | 9/1999 | Gruno et al. | .................. 52/630 |
| 6,054,207 A | * | 4/2000 | Finley | ...................... 428/317.9 |

FOREIGN PATENT DOCUMENTS

| | | |
|---|---|---|
| JP | 3000627 | 6/1994 |
| JP | 10-259308 | 9/1998 |

* cited by examiner

Primary Examiner—Michael Safavi
(74) Attorney, Agent, or Firm—Arent Fox Kintner Plotkin & Kahn, PLLC (57) ABSTRACT

A building panel formed by extruding a mixture of wooden and/or bamboo powder and a binding agent. Its panel body comprises (i) a door panel extending in the direction of extrusion, (ii) a pair of longitudinal frame members formed in the direction of extrusion on the right and left sides of the door panel, and (iii) a panel strip formed in the direction of extrusion at the center of the door panel. The door panel, the paired longitudinal frame members, and the panel strip are formed as a single piece. The door panel and the panel strip are cut short at their upper and lower ends so that the upper and lower ends of the longitudinal frame members stand out beyond the cut ends of the door panel and the panel strip, the standing-out portions constituting tenons.

15 Claims, 12 Drawing Sheets

BUILDING PANEL

BACKGROUND OF THE INVENTION

The present invention relates to a building panel.

Figure 12:
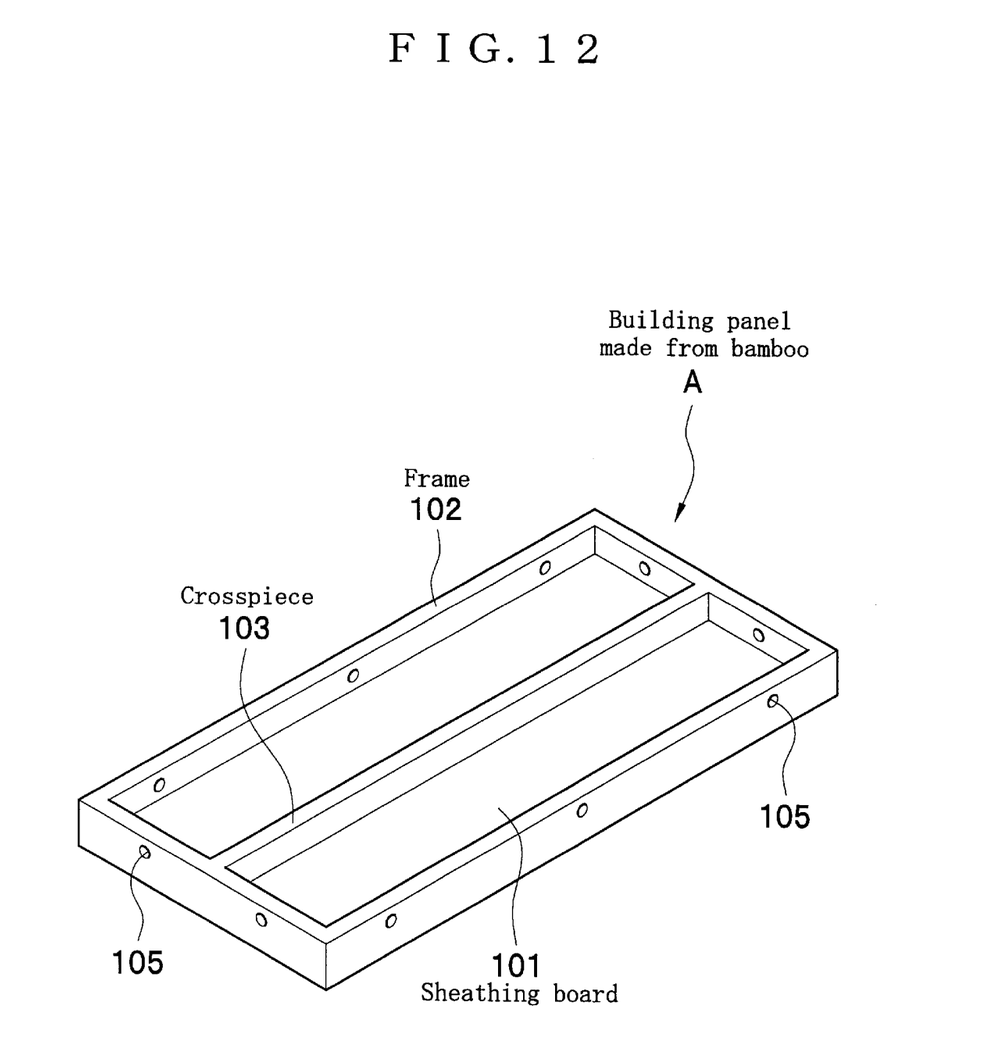
FIG. 12 is a schematic perspective view of a building panel made from bamboo of a prior art.

A building panel for the panel construction method is disclosed in the Japanese Utility Model Registration No. 3000627. FIG. 12 is a schematic perspective view of the building panel A made from bamboo. As is shown in FIG. 12, the building panel A comprises a sheathing board 101, a frame 102, and a crosspiece 103. The mixture of bamboo chips and an adhesive is formed under hot temperature and high pressure in a mold with a press into each member of the building panel A. Made in the frame 102 are holes 105 to join a number of pieces of the building panel A to one another. Accordingly, the building panel A has excellent strength and is light, inexpensive, and easy to install.

However, to produce the building panel A, the sheathing board 101, the frame 102, and the crosspiece 103 are produced separately and, then, these members are assembled into the building panel A with a press, by a batch process. Accordingly, its production efficiency is low.

On the other hand, a large quantity of waste wood such as construction and demolition wastes, thinning, and mills ends (lumbering ends) and a large quantity of waste vinyl films from agricultural vinyl houses are disposed of in our society, creating serious social problems. Accordingly, technology to recycle such wastes is hoped for.

In accordance with the above, the object of the present invention is to provide a building panel which can be produced from waste wood and bamboo and waste vinyl films, has excellent strength, is light and inexpensive, and can be produced continuously and efficiently.

SUMMARY OF THE INVENTION

According to the first aspect of the present invention, there is provided a building panel formed by extruding a mixture of wooden powder and a binding agent.

According to the second aspect of the present invention, there is provided a building panel formed by extruding a mixture of bamboo powder and a binding agent.

According to the third aspect of the present invention, there is provided a building panel formed by extruding a mixture of wooden and bamboo powder and a binding agent.

According to the fourth aspect of the present invention, there is provided the building panel of the first, second, or third aspect, which comprises (i) a door panel extending in the direction of extrusion, (ii) a pair of longitudinal frame members formed in the direction of extrusion on the right and left sides of the door panel, the sides lying in the direction of extrusion, and (iii) a panel strip formed in the direction of extrusion at the center of the door panel. The door panel, the paired longitudinal frame members, and the panel strip are formed as a single piece by extrusion. The door panel and the panel strip are cut short at their upper and lower ends so that the upper and lower ends of the longitudinal frame members stand out beyond the cut ends of the door panel and the panel strip, the standing out portions constituting tenons.

According to the fifth aspect of the present invention, there is provided the building panel of the fourth aspect, wherein each longitudinal frame member has a plurality of fixing holes. The fixing holes of each longitudinal frame member are arranged with spacing between them in the direction of length of the longitudinal frame member and penetrate the longitudinal frame member in the direction of its width.

According to the sixth aspect of the present invention, there is provided the building panel of the fourth or fifth aspect, wherein a layer of foamed heat-insulating material is formed.

According to the seventh aspect of the present invention, there is provided the building panel of the sixth aspect, wherein (i) a pair of plate-holding grooves is made in such a side surface of the panel strip and such a side surface of each longitudinal frame member as are facing each other, one groove of the pair being made in the side surface of the former and the other being made in the side surface of the latter, (ii) a reinforcing plate is inserted in the plate-holding grooves of each pair, and (iii) the layer of foamed heat-insulating material is formed so as to fill the space between the door panel and each reinforcing plate.

According to the eighth aspect of the present invention, there is provided the building panel of the first, second, third, fourth, fifth, sixth, or seventh aspect, of which the powder is of waste wood and/or bamboo and of which the binding agent is of waste vinyl films.

The advantages offered by the first, second, or third aspect of the invention are as follows. Because the materials of the building panel are wooden and/or bamboo powder and a binding agent, the building panel can be produced inexpensively and is light. Besides, because the building panel is produced by an extrusion process, it can be produced continuously and efficiently.

The advantages offered by the fourth aspect of the invention are as follows. Because the door panel, the pair of longitudinal frame members, and the panel strip of the building panel are formed as a single piece by extrusion, the building panel has excellent strength. Besides, because the upper and lower ends of each longitudinal frame member constitute tenons, the building panel can easily be installed between upper and lower beams by inserting the tenons of the building panel into the mortises of the beams.

The advantage offered by the fifth aspect of the invention is as follows. A number of pieces of building panel can be joined to one another by setting them side by side, inserting a bolt into every pair of fixing holes communicating with each other of the longitudinal frame members, and tightening nuts on the bolts.

The advantages offered by the sixth aspect of the invention are as follows. Because the building panel has a layer of foamed heat-insulating material, structures of high thermal efficiency can be built. Besides, the building panel has a high sound-insulation property.

The advantages offered by the seventh aspect of the invention are as follows. The pair of reinforcing plates raises the strength of the building panel. Besides, the pair of foamed heat insulators can easily be provided just by injecting a foaming heat-insulating material into the spaces between the door panel and the reinforcing plates.

The advantage offered by the eighth aspect of the invention is as follows. Because the materials of the building panel are waste wood and/or bamboo and waste vinyl films, such wastes can be recycled, reducing waste problems in our society.

BRIEF DESCRIPTION OF THE DRAWINGS

The features and advantages of the present invention will become more clearly appreciated from the following description in conjunction with the accompanying drawings, in which.

DETAILED DESCRIPTION OF THE PREFERRED EMBODIMENTS

A preferred embodiment of the present invention will now be described with reference to the drawings.

Figure 1:
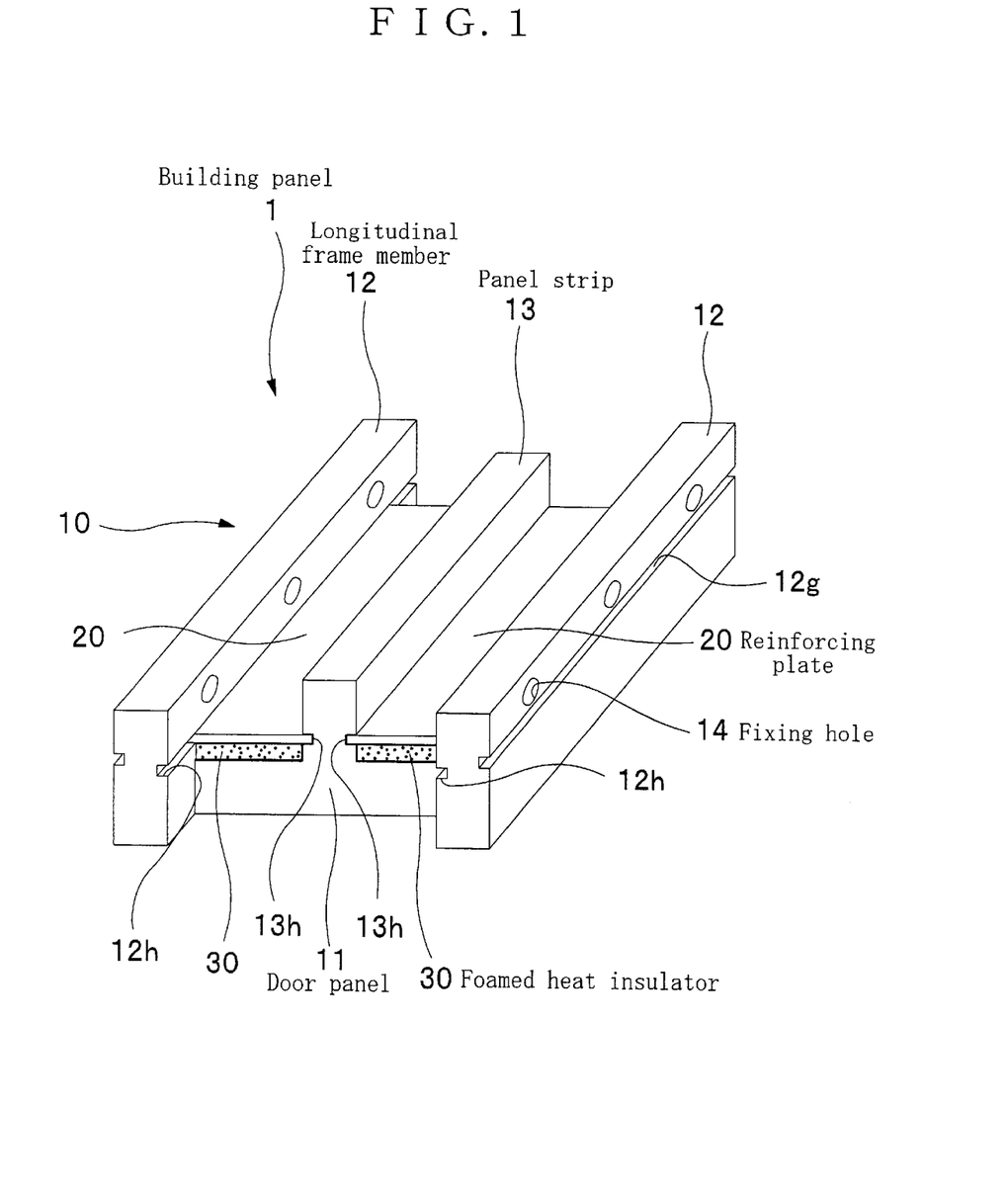
FIG. 1 is a schematic perspective view of an embodiment of building panel of the present invention.
Figure 2:
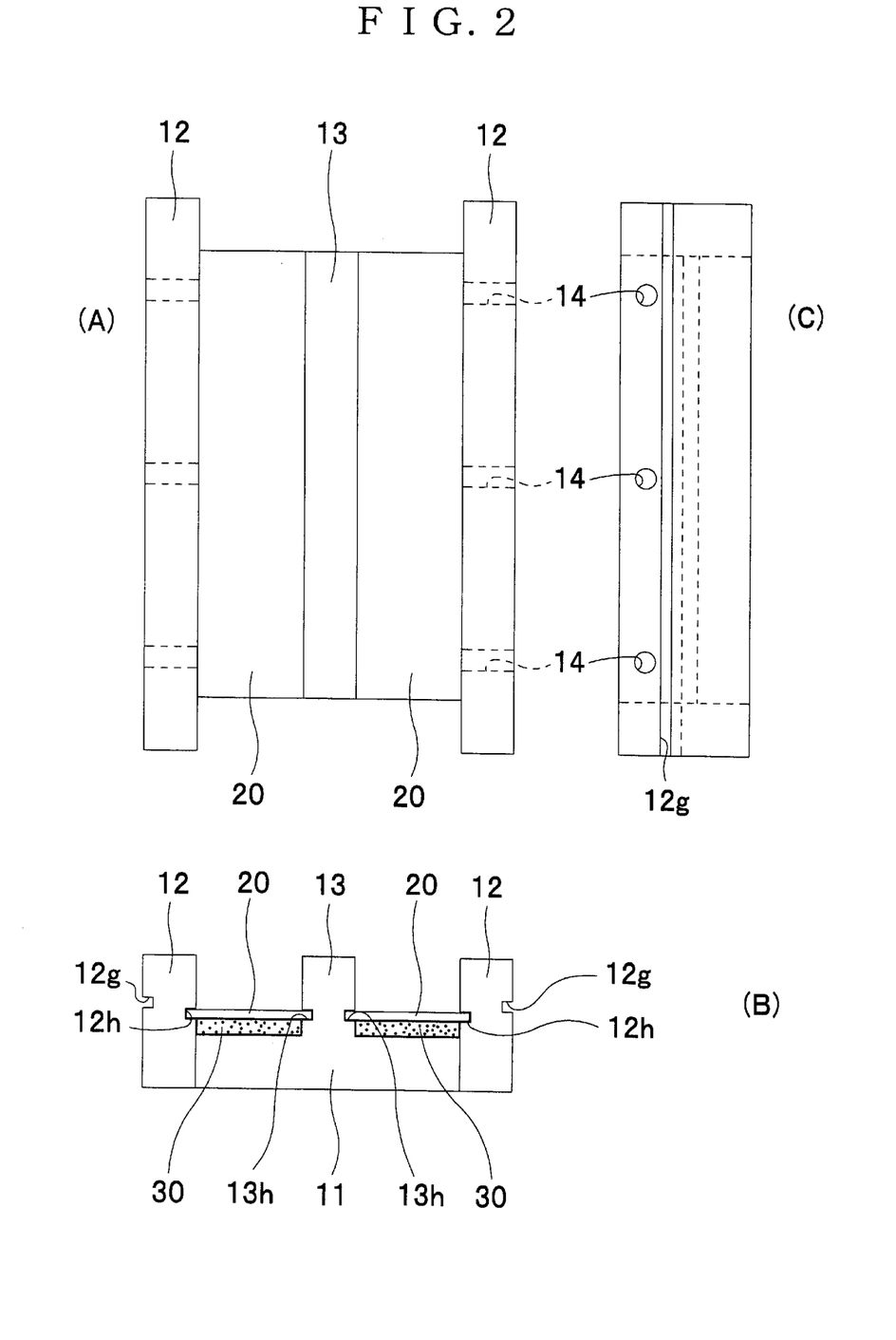
FIG. 2(A) is a plan view of the building panel of FIG. 1.
FIG. 2(B), a front view.
FIG. 2(C), a side view.

As is shown in FIGS. 1 and 2, the building panel 1 comprises a panel body 10, a pair of reinforcing plates 20, and a pair of foamed heat insulators 30.

The panel body 10 will be described first.

The panel body 10 comprises a door panel 11, a pair of longitudinal frame members 12 and 12, and a panel strip 13. The door panel 11, the pair of longitudinal frame members 12 and 12, and the panel strip 13 are formed as a single piece by extruding the mixture of wooden and/or bamboo power and a binding agent. The details of the extrusion molding will be described later.

The door panel 11 of the panel body 10 is a flat, rectangular panel extending in the direction of extrusion.

A pair of longitudinal frame members 12 and 12 is formed in the direction of extrusion on the right and left sides of the door panel 11.

A plate-holding groove 12h is made longitudinally in the inner side surface of each longitudinal frame member 12. A packing groove 12g is made longitudinally in the outer side surface of each longitudinal frame member 12. Each longitudinal frame member 12 has a plurality of fixing holes 14, which are arranged with spacing between them in the direction of length of the longitudinal frame member 12 and penetrate the longitudinal frame member 12 in the direction of its width.

A panel strip 13 is formed in the direction of extrusion at the center of the door panel 11. A pair of plate-holding grooves 13h and 13h are made longitudinally in the right and left side surfaces of the panel strip 13. Each plate-holding groove 13h is disposed opposite to a plate holding groove 12h.

The door panel 11 and the panel strip 13 are cut short at their upper and lower ends so that the upper and lower ends of the longitudinal frame members 12 stand out beyond the cut ends of the door panel 11 and the panel strip 13, the standing-out portions constituting tenons.

Now the reinforcing plates 20 will be described.

On each side of the panel strip 13 of the panel body 10, a reinforcing plate 20 is inserted in and between the plate-holding groove 13h of the panel strip 13 and the plate-holding groove 12h of the longitudinal frame member 12. Sheets of plywood, for example, are suitable for the use as the reinforcing plates 20.

The foamed heat insulators 30 will be described next.

A foaming heat-insulating material such as a non-fluorocarbon foaming insulating material or foaming urethane is injected into the space between the door panel 11 and each reinforcing plate 20 to form a foamed heat insulator 30 which has a high heat-insulation property. Besides, The foamed heat insulators 30 have a high sound-insulation property because they consist of bubbles.

Now the production process of the building panel 1 will be described.

Figure 3:
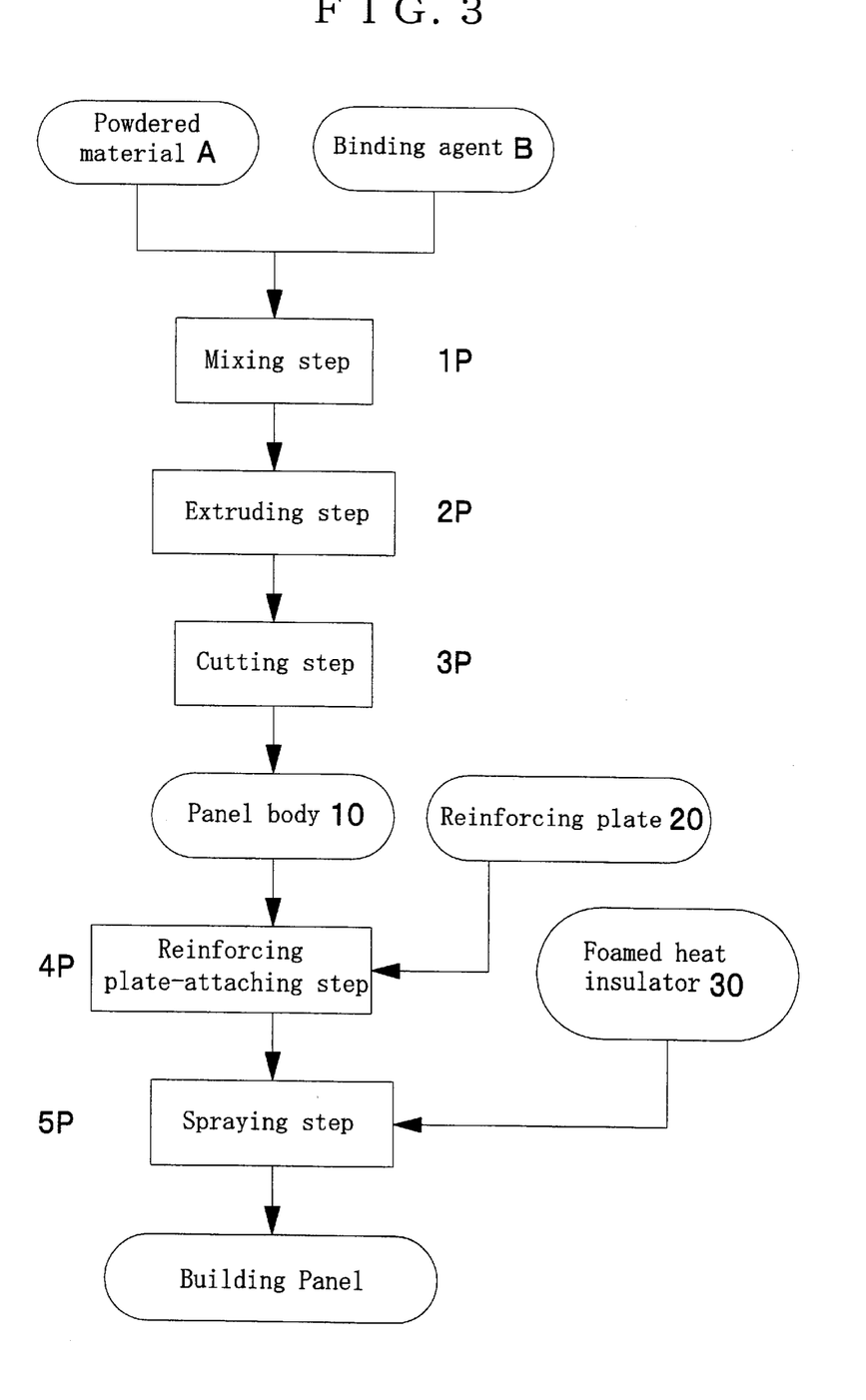
FIG. 3 is a flow sheet showing the production process of the building panel of FIG. 1.

The production process of the building panel 1 is shown in FIG. 3. The reference letters "A" and "B" indicate a powdered material and a binding agent, respectively.

The powdered material A is the powder, of particle size of 1.0–5.0 mm, of wood and/or bamboo such as construction and demolition wastes, thinning, and mills ends (lumbering ends) which were disposed of or are to be disposed of.

The binding agent B is pellets of waste vinyl films such as polyvinyl chloride films from agricultural vinyl houses which were disposed of or are to be disposed of.

Namely, because the building panel 1 is produced from the above wastes, such wastes can be recycled and hence waste problems in our society are reduced.

Isocyanate adhesives may be used as the binding agent B, which increases the disaster-preventive effect of the building panel 1.

The mixing step 1P will be described first.

The powdered material A and the binding agent B are mixed in the weight ratio of 6:4 into a mixture (1P).

The extruding step 2P will be described next.

Figure 4:
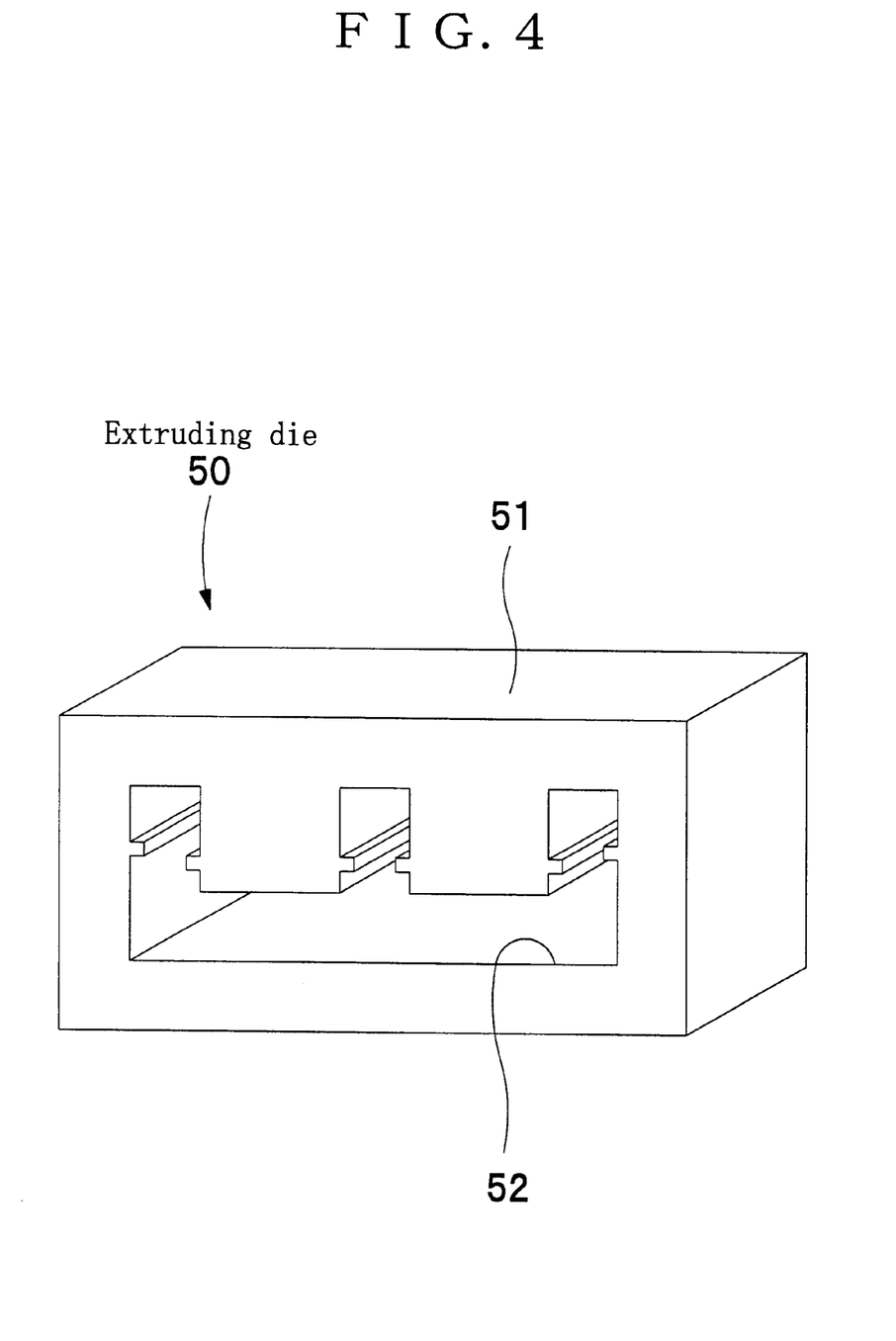
FIG. 4 is a schematic perspective view of an extruding die to be used in the extruding step of the building panel of FIG. 1.

An extruding die 50 is shown in FIG. 4. An exit 52 is made in the die body 51 of the extruding die 50. The mixture is extruded from the extruding die 50 to be formed into a continuous panel body (2P).

Figure 5:
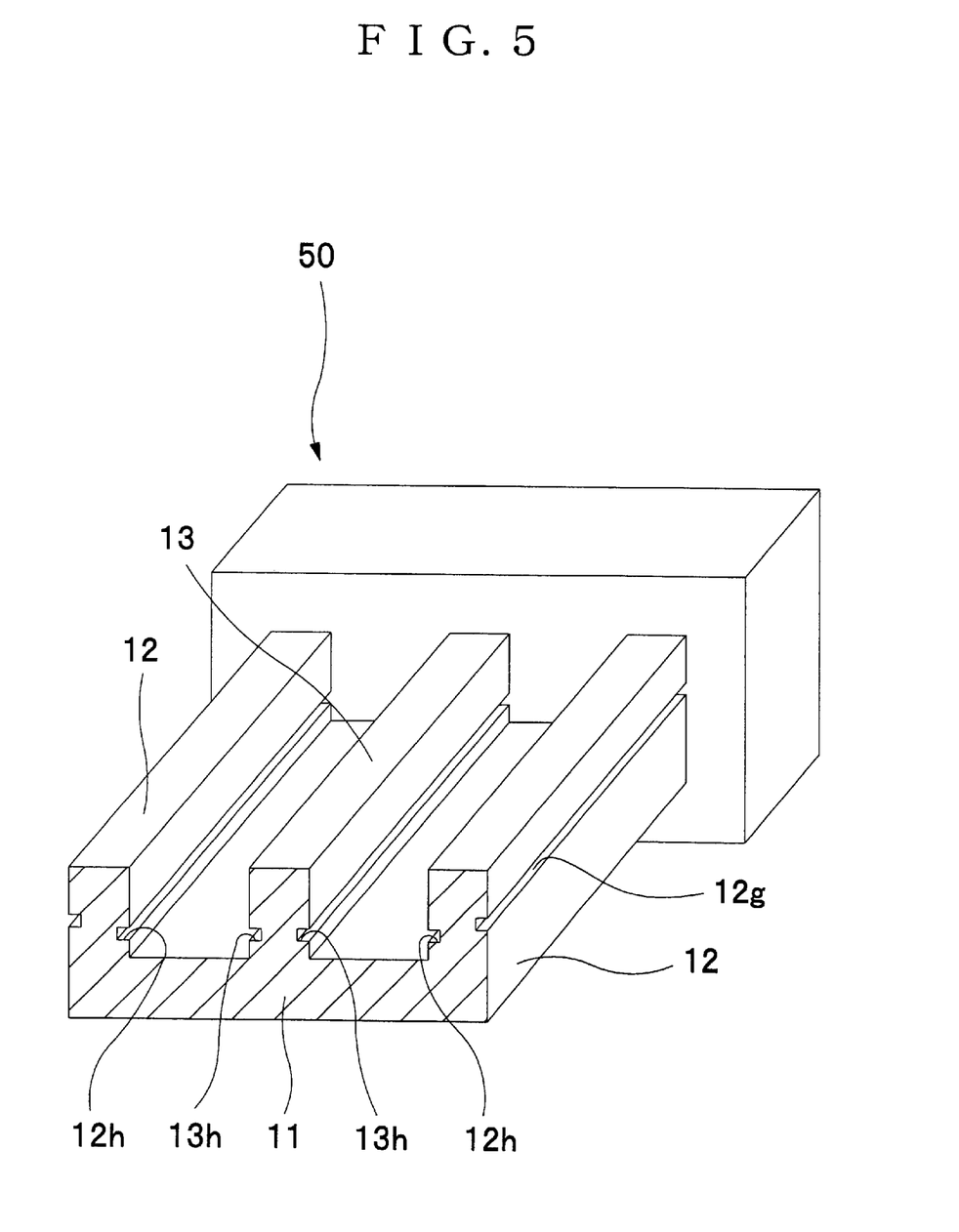
FIG. 5 is an illustration of the extruding step of the building panel of FIG. 1.

The extruding step 2P is illustrated in FIG. 5. As is shown in the Fig., the mixture is extruded from the exit 52 continuously.

The cutting step 3P will be described next.

FIG. 6(A) is a plan view of the panel body 10; FIG. 6(B), a front view; FIG. 6(C), a side view. The extruded continuous panel body is cut into pieces of the panel body 10 with a cutter such as a power saw (3P).

Figure 6:
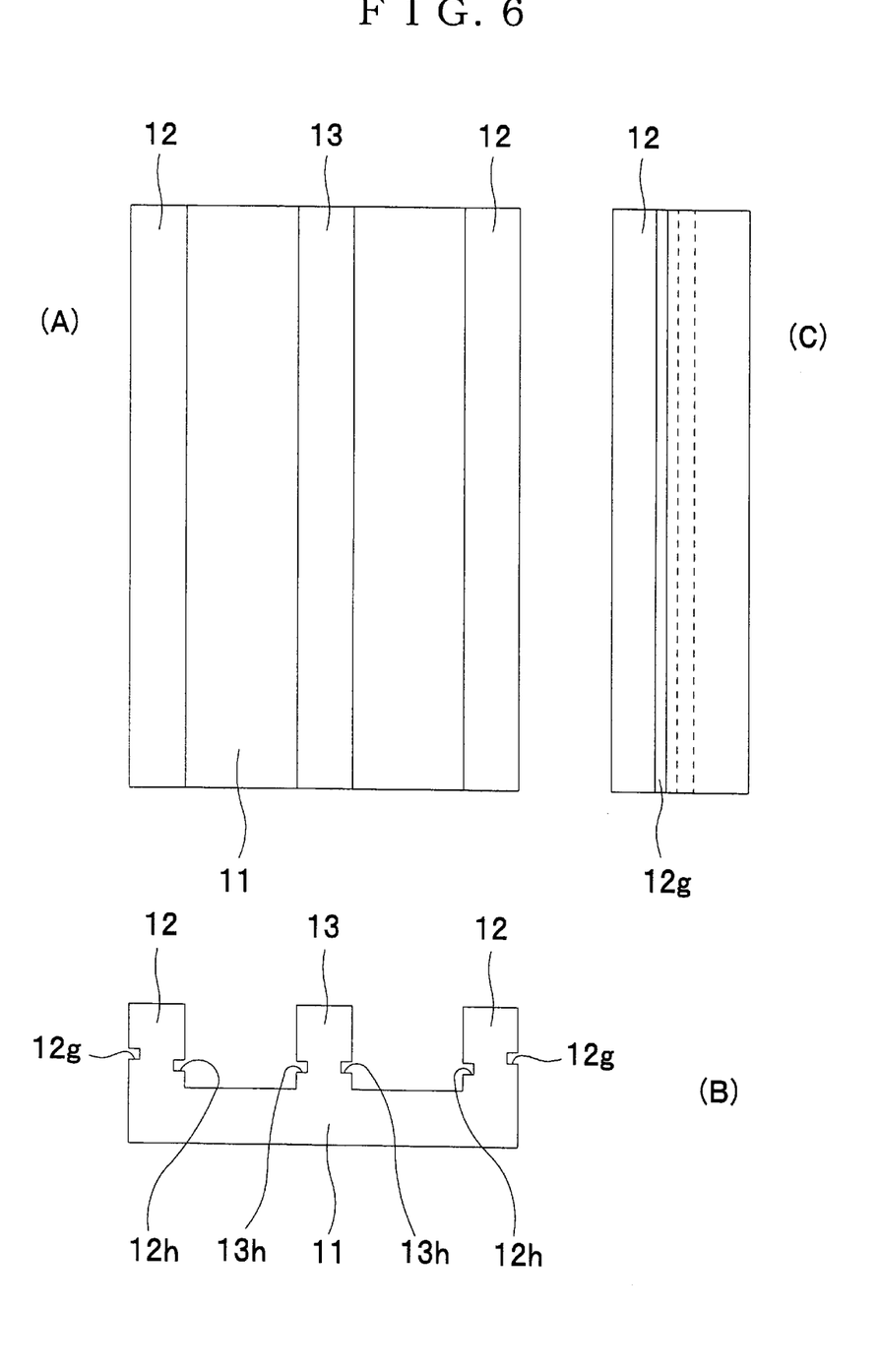
FIG. 6(A) is a plan view of the panel body of the building panel of FIG. 1.
FIG. 6(B), a front view.
FIG. 6(C), a side view.
Figure 7:
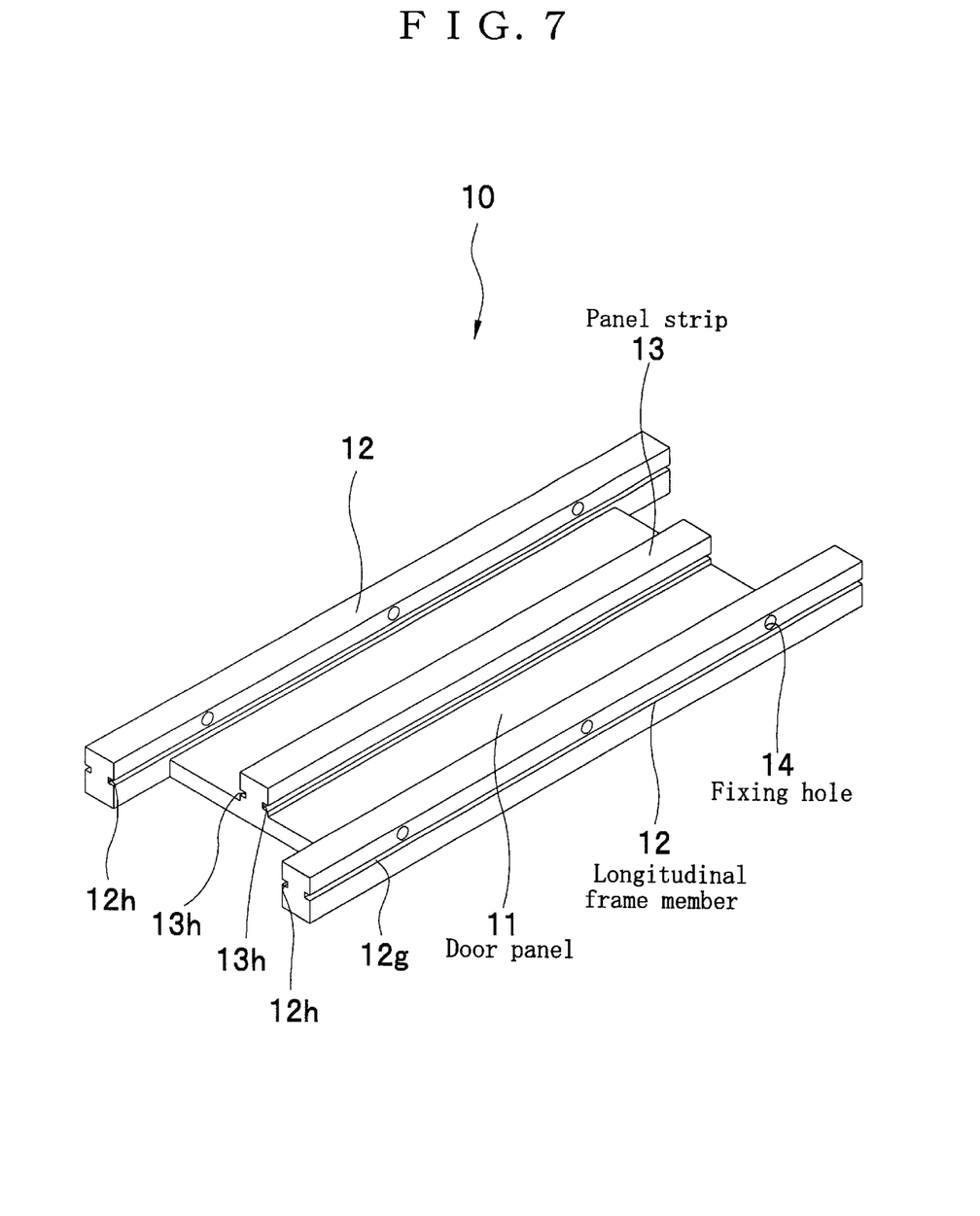
FIG. 7 is a schematic perspective view of the panel body of FIG. 6.

FIG. 7 is a schematic perspective view of the panel body 10. As is shown in FIG. 6, the panel body 10 immediately after cutting off has a door panel 11, a pair of right and left longitudinal frame members 12, and a panel strip 13 of one and the same length. Each longitudinal frame member 12 has a longitudinal plate-holding groove 12h on its inner side and a longitudinal packing groove 12g on its outer side.

The door panel 11 and the panel strip 13 are cut short at their upper and lower ends with a circular saw or the like so that the upper and lower ends of the longitudinal frame members 12 stand out beyond the cut ends of the door panel 11 and the panel strip 13, the standing-out portions constituting tenons.

Then, a plurality of fixing holes 14 are made in each longitudinal frame member 12 with a drill or the like, the fixing holes 14 arranged with spacing between them in the direction of length of the frame member 12. Thus, the panel body 10 shown in FIGS. 1 and 2 is completed.

Because the panel body 10 comprising the door panel 11, the pair of longitudinal frame members 12, and the panel strip 13 is formed as a single piece by extrusion, the panel body 10 can be produced continuously and efficiently and is given a large strength.

The reinforcing plate-attaching step 4P will be described next.

On each side of the panel strip 13 of the panel body 10, a reinforcing plate 20 is inserted in and between the plate-holding groove 13h of the panel strip 13 and the plate-holding groove 12h of the longitudinal frame member 12 (4P). The pair of reinforcing plates 20 and 20 raises the strength of the building panel 1.

The spraying step 5P will be described next.

A foaming heat-insulating material is injected into the space between the door panel 11 and each reinforcing plate 20 to form a foamed heat insulator 30 (5P). Thus, a pair of foamed heat insulators 30 and 30 can be formed easily.

In this way, the building panel 1 is produced.

Now the action and effect of the building panel 1 will be described.

Figure 8:
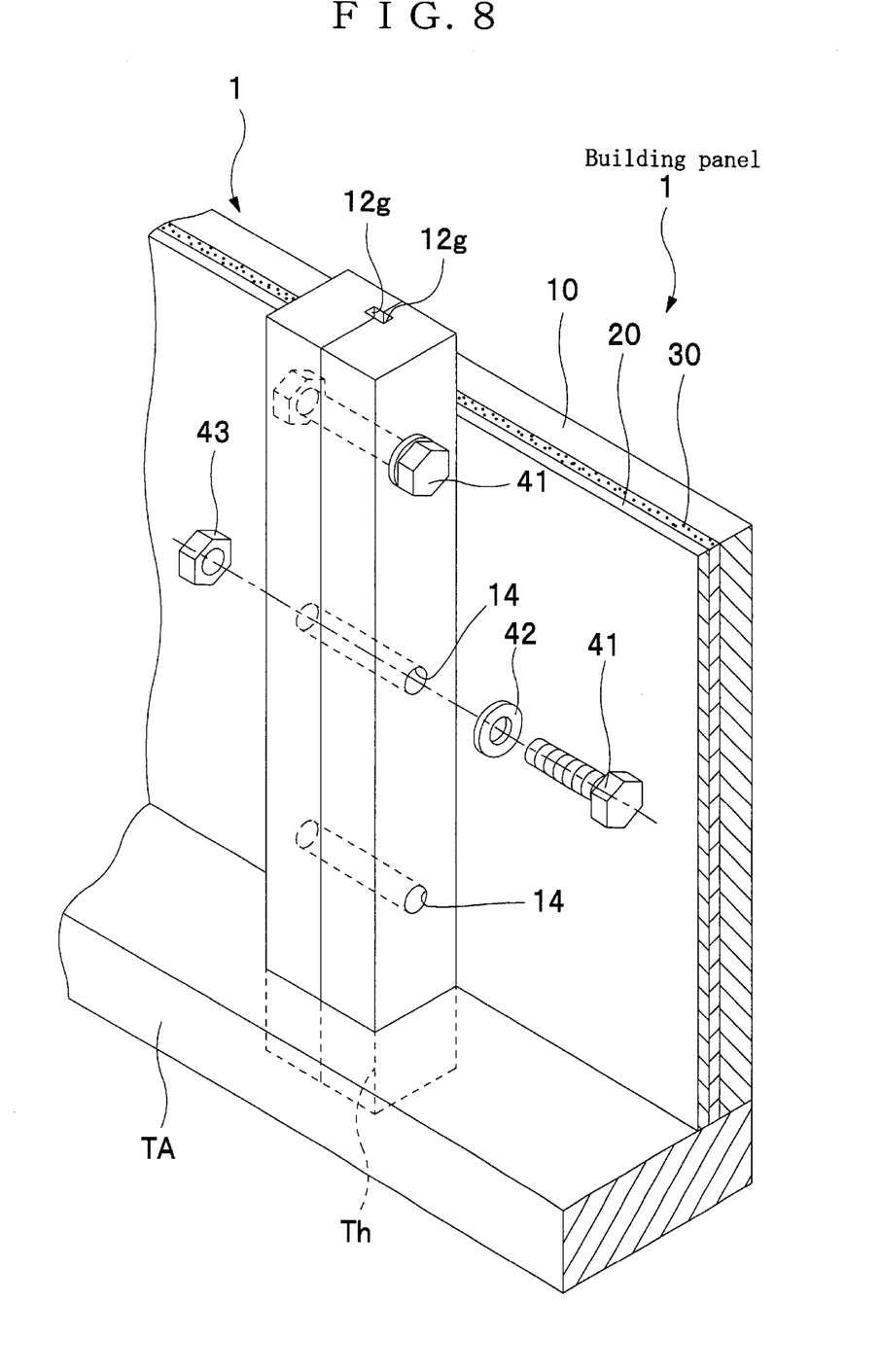
FIG. 8 is a schematic perspective view of two pieces of the building panel of FIG. 1 mounted on a beam.
Figure 9:
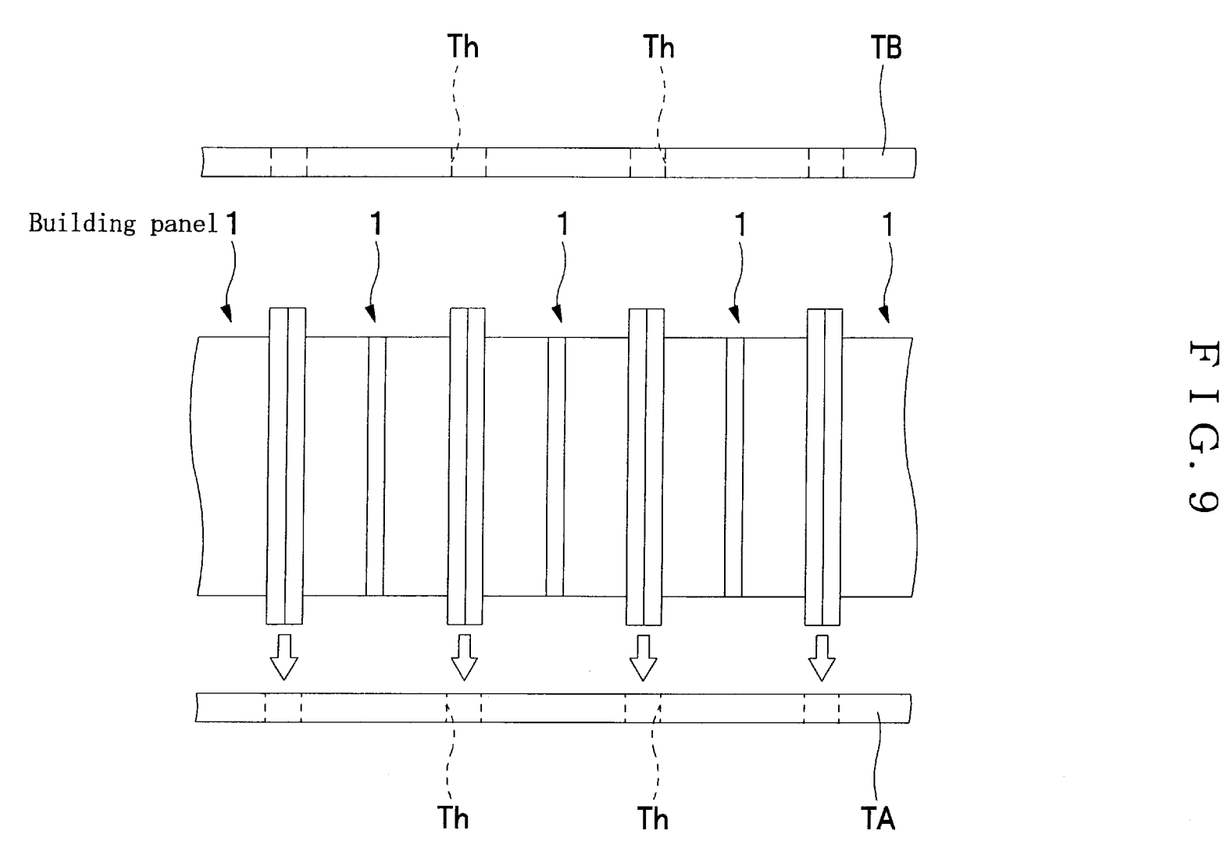
FIG. 9 is a rear view of a number of pieces of the building panel of FIG. 1 not yet joined to lower and upper beams.

FIG. 8 is a schematic perspective view of two pieces of the building panel 1 mounted on a beam TA. FIG. 9 is the rear view of pieces of building panel 1 not yet joined to lower and upper beams TA and TB. The beams TA and TB are horizontal ones. Each of the beams TA and TB has a plurality of mortises Th, which penetrate the beam and are arranged in the direction of length of the beam.

The mortises Th need not penetrate the beams TA and TB. They may come to a dead end halfway.

A number of pieces of building panel 1 are set on a beam TA, the former's lower tenons inserted into the latter's mortises Th, rubber packing or the like put between packing grooves 12g facing each other. Thus, a number of pieces of building panel 1 can easily be set on a beam TA.

Then, a bolt 41, a washer 42, and a nut 43 are applied to every pair of fixing holes 14 communicating with each other of the longitudinal frame members 12, and the nuts 43 are tightened. Thus, a number of pieces of building panel 1 can be joined to one another.

Then, another beam TB is set on the joined pieces of building panel 1, the latter's upper tenons inserted into the former's mortises Th. Thus, a number of pieces of building panel 1 can be secured between an upper beam TB and a lower beam TA.

Figure 10:
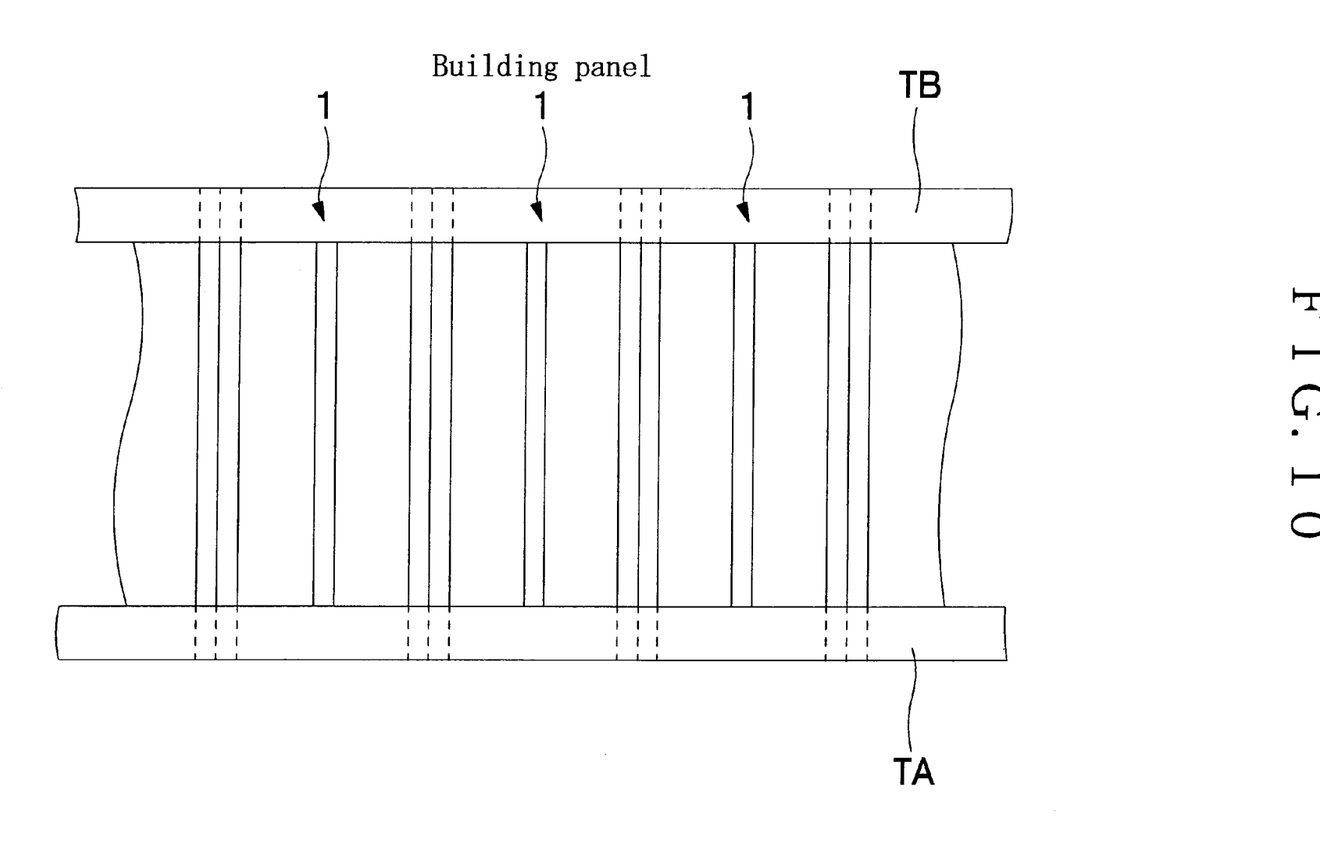
FIG. 10 is a rear elevation of a number of pieces of the building panel of FIG. 1 installed.
Figure 11:
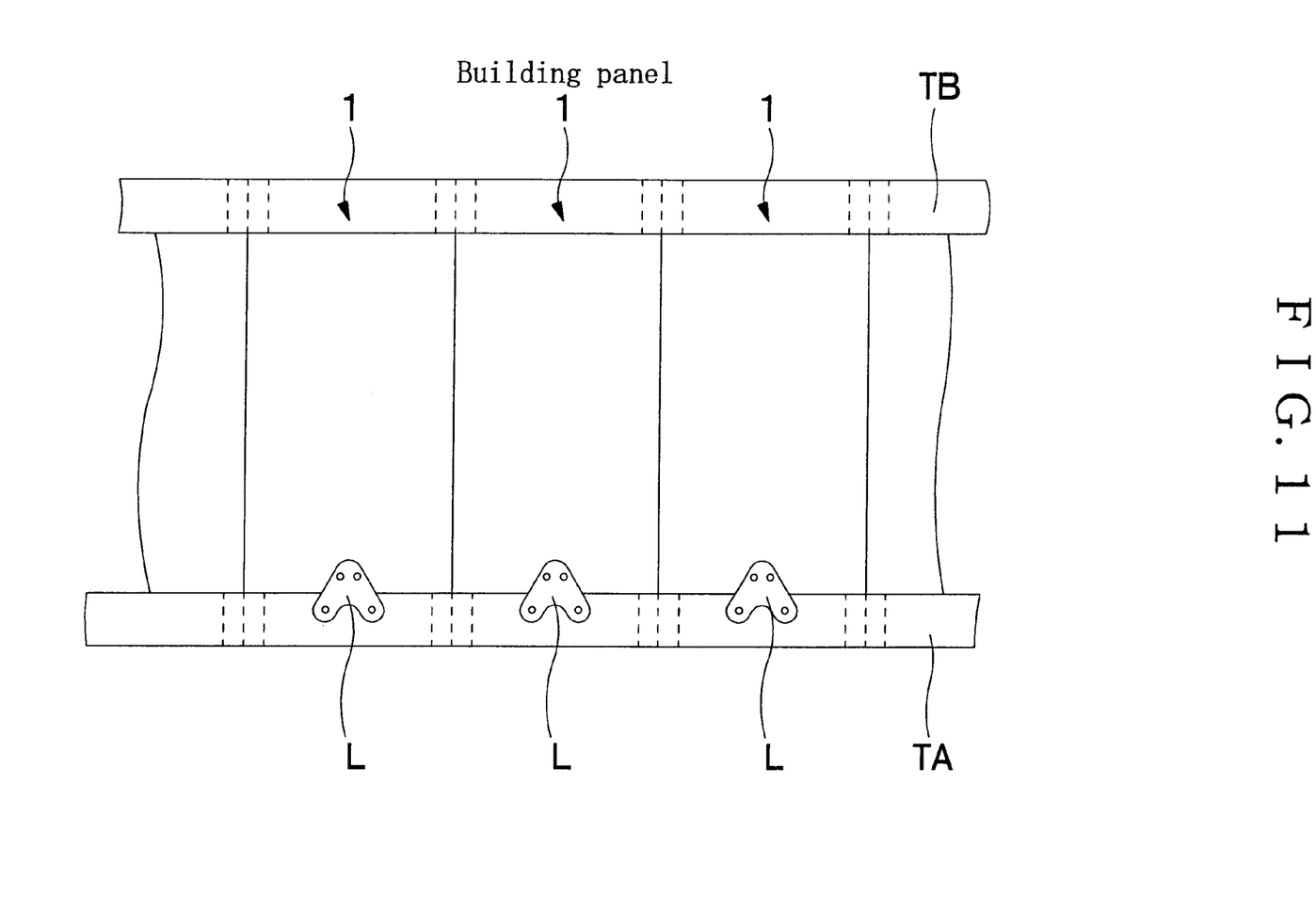
FIG. 11 is a front elevation of a number of pieces of the building panel of FIG. 1 installed.

FIG. 10 is a rear elevation of the building panel 1 installed; FIG. 11, a front elevation. As shown in FIG. 11, the bottom part of each piece of building panel 1 is fixed to the lower beam TA with a metal part L.

The invention may be embodied in other specific forms without departing from the spirit or essential characteristics thereof. The above embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What we claim is:

1. A building panel formed by extrusion, comprising:

a door panel extending in a direction of extrusion;

a pair of longitudinal frame members formed in the direction of extrusion on right and left sides of the door panel, the right and left sides of the door panel lay in the direction of extrusion and each frame member extends in a vertical direction perpendicular relative to the direction of extrusion; and a panel strip formed in the direction of extrusion at the center of the door panel and extends in the vertical direction perpendicular relative to the direction of extrusion, (i) the door panel, the paired longitudinal frame members, and the panel strip being formed as a single piece by extrusion, (ii) the door panel and the panel strip being cut short at upper and lower ends so upper and lower ends of the longitudinal frame members stand out beyond the cut ends of the door panel and the panel strip, the standing-out portions forming tenons, wherein each longitudinal frame member has a plurality of fixing holes which are arranged with spacing between them in the direction of length of the longitudinal frame member and penetrate the longitudinal frame member in the direction of its width.

2. The building panel according to claim 1, wherein the building panel is formed by extruding a mixture of wooden powder and a binding agent.

3. The building panel according to claim 1, wherein the building panel is formed by extruding a mixture of bamboo powder and a binding agent.

4. The building panel according to claim 1, wherein the building panel is formed by extruding a mixture of wooden and bamboo powder and a binding agent.

5. The building panel as claimed in claim 2, of which the powder is of waste wood, and bamboo, and the binding agent is a waste vinyl film.

6. The building panel as claimed in claim 3 of which the powder is of bamboo and the binding agent is a waste vinyl film.

7. The building panel as claimed in claim 4 of which the powder is of wood and bamboo and the binding agent is a waste vinyl film.

8. A building panel formed by extrusion, comprising:

a door panel extending in a direction of extrusion;

a pair of longitudinal frame members formed in the direction of extrusion on right and left sides of the door panel, the right and left sides of the door panel lay in the direction of extrusion and each frame member extends in a vertical direction perpendicular relative to the direction of extrusion; and a panel strip formed in the direction of extrusion at the center of the door panel and extends in the vertical direction perpendicular relative to the direction of extrusion, (i) the door panel, the paired longitudinal frame members, and the panel strip being formed as a single piece by extrusion, (ii) the door panel and the panel strip being cut short at upper and lower ends so upper and lower ends of the longitudinal frame members stand out beyond the cut ends of the door panel and the panel strip, the standing-out portions forming tenons, wherein a layer of foamed heat-insulating material is formed on an upper surface of the door panel.

9. The building panel as claimed in claim 8, wherein:

a pair of plate-holding grooves is made in each side surface of the panel strip and each side surface of each longitudinal frame member, wherein the respective plate-holding grooves of the panel strip and said each longitudinal frame member face each other, one groove of the pair being made in the side surface of the former and the other being made in the side surface of the latter;

a reinforcing plate is inserted in the plate-holding grooves of each pair; and the layer of foamed heat-insulating material is formed so as to fill the space between the door panel and each reinforcing plate.

10. The building panel according to claim 8, wherein the building panel is formed by extruding a mixture of wooden powder and a binding agent.

11. The building panel according to claim 8, wherein the building panel is formed by extruding a mixture of bamboo powder and a binding agent.

12. The building panel according to claim 8, wherein the building panel is formed by extruding a mixture of wooden and bamboo powder and a binding agent.

13. The building panel as claimed in claim 10, of which the powder is of waste wood, and the binding agent is a waste vinyl film.

14. The building panel as claimed in claim 11 of which the powder is of bamboo and the binding agent is a waste vinyl film.

15. The building panel as claimed in claim 12 of which the powder is of wood and bamboo and the binding agent is a waste vinyl film.

* * * * *